(12) United States Patent
Strandberg (10) Patent No.: US 6,889,195 B2
(45) Date of Patent: *May 3, 2005

(54) SYSTEM AND METHOD FOR UTILIZING A COMPUTER NETWORK IN CONJUNCTION WITH TRADITIONAL TELEMARKETING

(75) Inventor: Malcom B. Strandberg, Cambridge, MA (US)

(73) Assignee: CIM Ltd. (KY)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 237 days.

(21) Appl. No.: 09/153,684

(22) Filed: Sep. 15, 1998

(65) Prior Publication Data

US 2002/0161589 A1 Oct. 31, 2002

(51) Int. Cl.$^7$ .......................... G06F 17/60; G06F 17/30; G06F 7/00; G06F 15/16; H04M 3/00; H04M 5/00
(52) U.S. Cl. .............................. 705/1; 705/10; 707/10; 709/217; 709/218; 709/219; 379/265.09; 379/266.07
(58) Field of Search ............................... 705/10, 11, 1, 705/51; 380/1, 21; 707/1, 4, 7, 204; 709/217, 218, 219; 379/265.09, 265.13, 266.07

(56) References Cited

U.S. PATENT DOCUMENTS

| | | | | |
|---|---|---|---|---|
| 4,438,296 A | * | 3/1984 | Smith | 379/69 |
| 4,788,682 A | * | 11/1988 | Vij et al. | 370/259 |
| 5,528,678 A | * | 6/1996 | Kaplan | 379/201 |
| 5,790,793 A | * | 8/1998 | Higley | 709/218 |
| 5,794,039 A | * | 8/1998 | Guck | 707/103 R |
| 5,794,207 A | * | 8/1998 | Walker et al. | 705/1 |
| 5,835,087 A | * | 11/1998 | Herz et al. | 345/327 |
| 5,893,098 A | * | 4/1999 | Peters et al. | 707/10 |
| 5,901,213 A | * | 5/1999 | Benhabib et al. | 379/220 |
| 5,905,778 A | * | 5/1999 | Shires | 379/93.01 |
| 5,923,745 A | * | 7/1999 | Hurd | 379/265.02 |
| 5,933,476 A | * | 8/1999 | Hansen et al. | 379/52 |

(Continued)

FOREIGN PATENT DOCUMENTS

WO    WO 98/13765    * 4/1998

OTHER PUBLICATIONS

Anon., "IBM Award Winner BEI to Intro Java App on CNN," Newsbytes News Network, Feb. 23, 1998.*
Reff, B.J. Computing Canada, vol. 19, No. 6, p. 20 "Group Scheduling Programs," (Abstract), Mar. 15, 1993.*
Cabeceiras, T., Telemarketing & Call Center Solutions, vol. 14, No. 12, p. 48, "Security Options in On-line Commerce," Jun. 1996.*

(Continued)

*Primary Examiner*—Nicholas D. Rosen
(74) *Attorney, Agent, or Firm*—Bourque & Assoc., PA (57) ABSTRACT

A system for contacting an interested party utilizing a computer network includes an interested party database including a field containing a first e-mail address used to address an e-mail message to an interested party and an e-mail general or responsive to the first e-mail address and generating the first e-mail message addressed to the first e-mail address of the interested party. The generator also sends the first e-mail message to the interested party's first e-mail address. The first e-mail message includes a response message portion including a second e-mail message. The second e-mail message is addressed to a second e-mail address (sending party's e-mail address. The response message portion is responsive to the first e-mail message being read, for sending the second e-mail message to the sending party's e-mail address. The system further includes a database responsive to the second e-mail message storing data associated therewith.

17 Claims, 5 Drawing Sheets

U.S. PATENT DOCUMENTS

| | | | | | |
|---|---|---|---|---|---|
| 5,956,693 | A | * | 9/1999 | Geerlings | 705/14 |
| 5,970,491 | A | * | 10/1999 | Schreiber et al. | 707/10 |
| 6,031,836 | A | * | 2/2000 | Haserodt | 370/389 |
| 6,041,356 | A | * | 3/2000 | Mohammed | 709/227 |
| 6,047,264 | A | * | 4/2000 | Fisher et al. | 705/26 |
| 6,055,505 | A | * | 4/2000 | Elston | 705/1 |
| 6,055,513 | A | * | 4/2000 | Katz et al. | 705/26 |
| 6,070,149 | A | * | 5/2000 | Tavor et al. | 705/26 |
| 6,081,830 | A | * | 6/2000 | Schindler | 709/204 |
| 6,094,673 | A | * | 7/2000 | Dilip et al. | 709/202 |
| 6,094,676 | A | * | 7/2000 | Gray et al. | 709/217 |
| 6,108,711 | A | * | 8/2000 | Beck et al. | 709/242 |
| 6,128,646 | A | * | 10/2000 | Miloslavsky | 709/206 |
| 6,134,318 | A | * | 10/2000 | O'Neil | 379/266.01 |
| 6,170,011 | B1 | * | 1/2001 | Macleod Beck et al. | 709/224 |
| 6,256,620 | B1 | * | 7/2001 | Jawahar et al. | 707/2 |
| 6,385,646 | B1 | * | 5/2002 | Brown et al. | 709/217 |
| 6,408,065 | B1 | * | 6/2002 | O'Neil et al. | 379/265.09 |
| 6,421,708 | B2 | * | 7/2002 | Bettis | 709/206 |
| 6,463,149 | B1 | * | 10/2002 | Jolissaint et al. | 379/265.09 |
| 6,651,166 | B1 | * | 11/2003 | Smith et al. | 713/150 |
| 2001/0021948 | A1 | * | 9/2001 | Khouri et al. | 709/218 |
| 2001/0054064 | A1 | * | 12/2001 | Kannnan | 709/203 |

OTHER PUBLICATIONS

MacPherson, G., Business Communications Review, vol. 26, No. 6, p. 39, "Why Call Centers Won't Escape the World Wide Web," Jun. 1996.*

Fried, J., Telemarketing & Call Center Solutions, vol. 15, No. 2, p. 90, "ACDs in the Increased 'Zone of Contact'"Aug. 1996.*

Rohde, D., Network World, vol. 13, No. 33, p. 17, "Call Centers Link to Net," Aug. 12, 1996.*

Chiranky, L., Telemarketing & Call Center Solutions, vol. 15, No. 7, p. 96, "Web Power: Taking Call Centers to New Dimensions," Jan. 1997.*

Chiranky, L., Telemarketing & Call Center Solutions, vol. 15, No. 7, p. 98, "Customer Advocacy Paradigm: the Bonnie Button and Beyond," Jan. 1997.*

Knowles, A., Datamation, vol. 43, No. 2, p. 68, "Find out What Your Customers Really Want," Feb. 1997.*

Stites, E.M., Telemarketing & Call Centers Solutions, vol. 16, No. 3, p. 74, "Outsourcing the Customer Life Cycle," Sep. 1997.*

Farrow, P., Precision Marketing, p. 33, "Special Report: Call Centres: Freed by a Web of Lines," Apr. 27, 1998.*

Carter, M., Campaign, p. 39, "Down the Line," (Abstract) Jun. 26, 1998.*

* cited by examiner

| TO: INTERESTED PARTY E-MAIL ADDRESS |
|---|
| FROM: CALL CENTER E-MAIL ADDRESS |
| MESSAGE INFORMATION |
| RESPONSE METHODS |
| HTTP: URL ADDRESS WITH UNIQUE ID/CALL CENTER TELEPHONE NUMBER WITH UNIQUE ID | MAIL TO: CALL CENTER E-MAIL ADDRESS WITH UNIQUE ID |
| OTHER ACTIVE OBJECTS AS AVAILABLE TO DIFFERENT MAIL PROGRAMS |

SYSTEM AND METHOD FOR UTILIZING A COMPUTER NETWORK IN CONJUNCTION WITH TRADITIONAL TELEMARKETING

FIELD OF THE INVENTION

The present invention relates generally to telemarketing and more particularly, to a system and method utilizing a computer network in conjunction with traditional telemarketing techniques.

BACKGROUND OF THE INVENTION

Businesses such as customer service organizations and telemarketing organizations utilize automated telephone call centers to process and route incoming telephone calls to agents.

These organizations typically have databases containing information both on their customers and also on potentially interested parties. For example, a customer service organization will often have at least telephone and address information on its customers and possibly account information as well. Often the customers have provided such information by previously filling out information cards to register for a warranty or service plan.

Similarly, a telemarketing organization may develop data on potentially interested parties in many ways. For example, by cold calling parties, or by sending bulk mail with return cards filled out by interested parties. This information has typically included at least a name, a telephone number and an address to send information to. Today, with greater variety of means of communication available, this information may also include an e-mail address.

In the past, these organizations having to contact interested parties or customers have been limited to either using a telephone or traditional mail to contact, and to provide information to, the interested parties or customers.

Problems in using a telephone for contacting people are several. For example, a person may not be near their telephone and may miss the call. Even if the interested party has an answering machine, there is no way to ensure that the proper party receives the message. In addition, security or privacy may be of a concern. If so, then leaving a message on an answering machine would clearly be unacceptable. Also, there is no way of knowing when a party received the information.

Similarly, using traditional mail service would not preclude unauthorized access to the information, nor would it provide any way of determining when the package was received.

Accordingly, what is needed is a system and method which provides the necessary security for the information being sent, provides the necessary privacy to the party to whom it is being sent, provides a date/time stamp upon receipt and or reading by the party to whom it is sent, and is nearly instantaneous in its transmission time.

SUMMARY OF THE INVENTION

A system for contacting an interested party utilizing a computer network is provided. The system includes at least one interested party database including at least one field of information containing at least a first electronic-mail address, for addressing a first electronic-mail message to a first interested party. Also included is at least one electronic-mail generator, responsive to said first electronic-mail address, for generating the first electronic-mail message addressed to the first electronic-mail address of the first interested party, and for sending the first electronic-mail message to the first electronic-mail address of the interested party.

The first electronic-mail message itself includes a response message portion, which includes a second electronic-mail message. The second electronic-mail message is addressed to a second electronic-mail address, which is an electronic-mail address of a sending party. The response message portion is responsive to the first electronic-mail message being read, for sending the second electronic-mail message to the electronic-mail address of said sending party.

The system further includes an electronic-mail log database, which is responsive to the second electronic-mail message for storing data associated with the second electronic-mail message.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
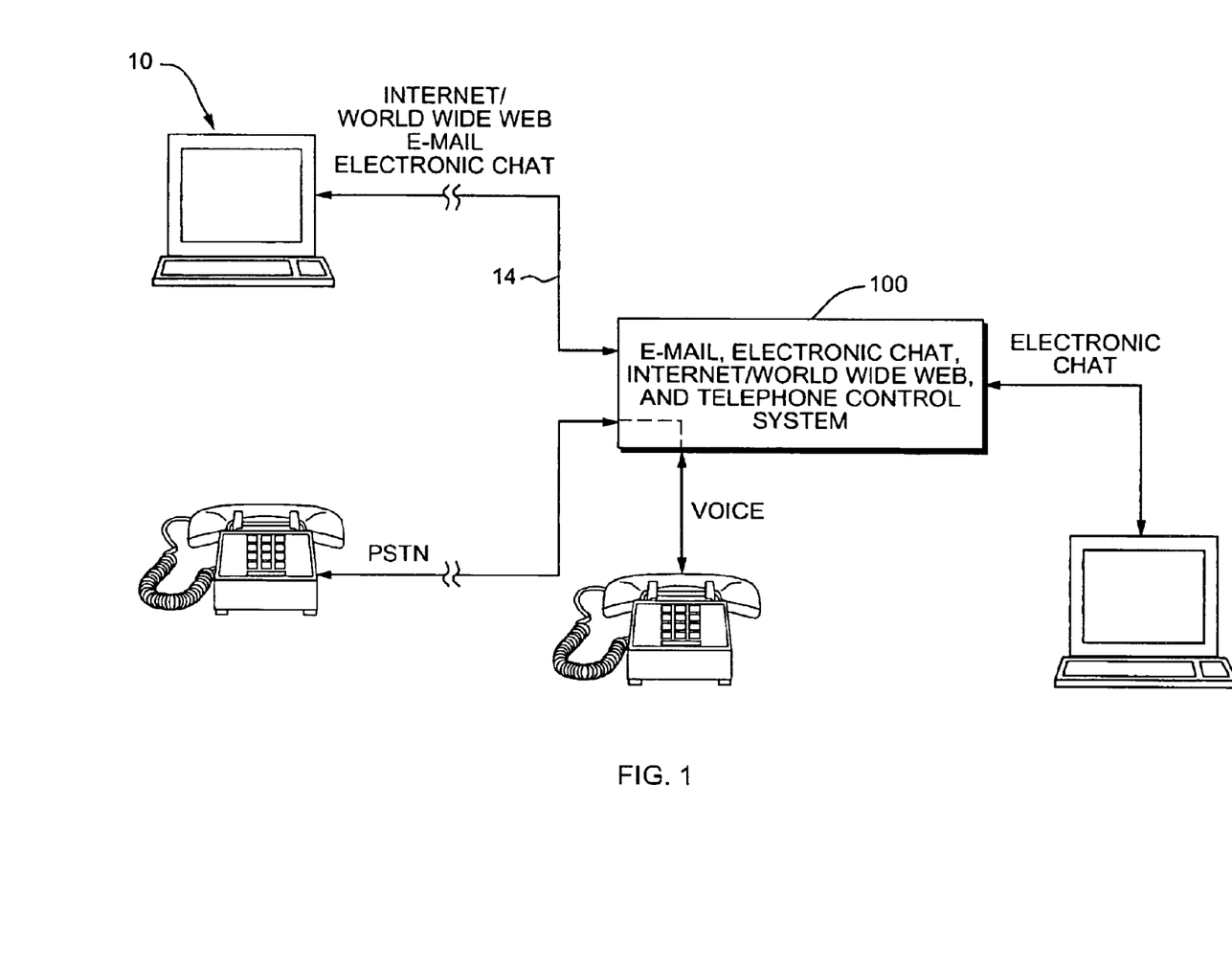
FIG. 1 is a schematic block diagram of the system for utilizing a computer network in conjunction with a traditional telemarketing system according to the present invention.

An e-mail, electronic chat, Internet-Web, and telephone control system 100 is illustrated in FIG. 1, in which an interested party from an interested party data terminal 10 accesses the e-mail, electronic chat, Internet-Web, and telephone control system (the system) 100 via a computer network 14, to communicate with a telemarketing call center to receive or to request information via the computer network 14. In addition, the interested party may wish to possibly engage in communication via electronic chat with a call agent on his or her data terminal 20 which will be done via the system 100. In addition, the system 100 is able to establish a telephone link via the Public Switched Telephone Network (PSTN) 17 between the customer telephone 16 and a call agent telephone 18.

Figure 2:
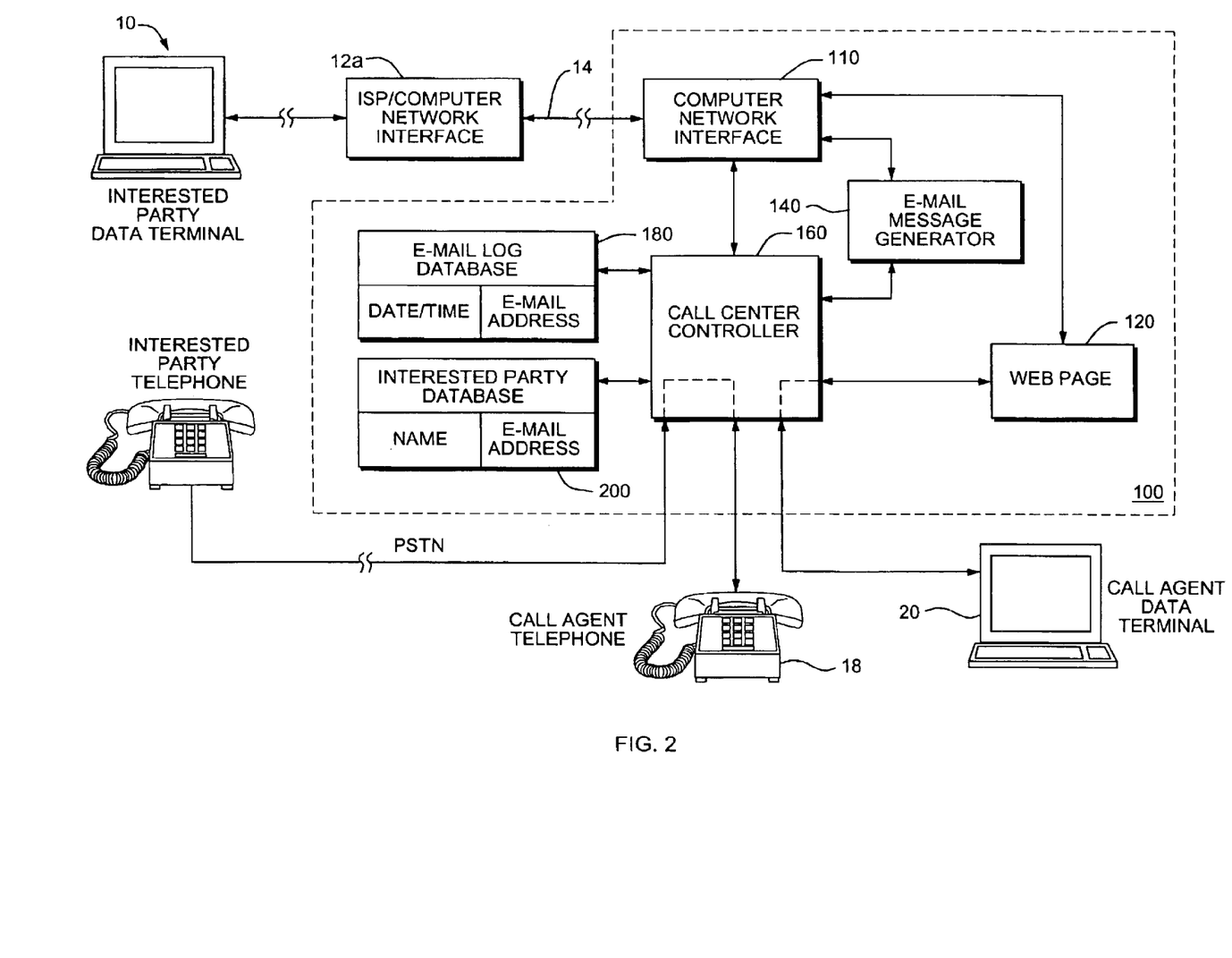
FIG. 2 is a more detailed schematic block diagram of the system for utilizing a computer network in conjunction with traditional telemarketing system.

Referring now to FIG. 2, the system 100 is shown in a more detailed view. The interested party database 200 may contain such information concerning the interested party such as their name, address, telephone number, account history, and in the preferred embodiment of this invention, an electronic mail (e-mail) address.

The call center controller 160, will read the entry in the interested party database 200 and pass the interested party's e-mail address to the e-mail generator 140. The e-mail generator 140 will then properly format and address an electronic mail message to the interested party. This e-mail message may contain information such as the information requested by the interested party, information concerning an account delinquency, a request for the interested party to call a particular telephone number, and/or a Uniform Resource Locator (URL) address of a particular Internet-World Wide Web address, including a unique ID to link to an interested party database record. The interested party may then find further information regarding their account, or their particular area of interest, and/or electronically communicate with a live person. The e-mail generator 140 then sends the properly formatted and addressed e-mail message to the computer network interface 110 which formats and addresses the electronic mail message into a form to be sent via the Internet-World Wide Web 14, to the interested party's computer network interface 12. In an optional embodiment, a preview campaign may first route an addressed e-mail message to a call center agent assigned to that campaign to allow the agent to amend the message, skip or escalate an associated telephone call campaign.

The call center controller 160 will log the time and the date that each e-mail message is sent from the e-mail generator 140 to an interested party as well. The computer network interface 12a is typically an Internet Service Provider (ISP) which will provide storage for the e-mail message and provide the interface for the interested party data terminal 10 to access the Internet-World Wide Web. The interested party will use the interested party data terminal 10 to access their ISP computer network interface 12a and receive an e-mail message sent by the system 100. The interested party may then respond to the e-mail message in various ways, depending upon the information contained in the message. For example, the interested party may choose to telephone the call center controller 150 directly, which will then handle the incoming telephone call from the PSTN as a normal telephone call. One example of a system that perform this function is the UNISON® telephone call center management system manufactured by the Davox Corporation of Westford, Mass., the Assignee of the present invention. The interested party may also access the computer network interface 12a and, via their ISP, access the Internet-World Wide Web 14 in order to electronically connect to the URL address of the Web page 120 provided in the electronic mail message sent to the interested party. The Web page 120 is also electronically connected to the call center controller 160, in order to alert the call center controller 160 that the interested party has accessed the particular URL address provided them. The call center controller 160 will then log the time, date and particular URL address accessed by the interested party in the interested party database 200. The call center controller 160 will also electronically connect a call agent data terminal 20, associated with a call center agent appropriate for that campaign or specific for the interested party, to the URL address which the interested party has accessed in order to provide an electronic signal connection to enable communication via electronic chat between the interested party and the call agent. Using a form of Internet relay chat, the agent and the interested party are linked by the unique ID. In one embodiment of the present invention, a separate window dialog box will appear on the screen on the interested party data terminal 10 wherein the key strokes typed by the call agent at the call agent data terminal 20 will be transmitted and displayed on the interested party data terminal 10, and the key strokes by the interested party at the interested party data terminal 10 will be transmitted to and displayed on the call agent data terminal 20. This will provide the opportunity for the interested party to communicate with a "live person" in order to receive more information or more detailed information than was sent in the e-mail message to the interested party.

It will be appreciated by those skilled in the art that a single call agent may communicate with several interested parties at one time, via electronic chat given the time delay required for typing of messages and reading of those messages. Thus a single connection does not have to be continuously maintained as in voice communication, a single call agent on a call agent data terminal 20 is much more efficient in that he is able to deal with many interested parties at the same time, thus reducing the hold period for an interested party.

In addition, security measures may be taken such as encrypting the e-mail message sent to the interested party wherein the interested party has a key to decode the encrypted e-mail message, or a password may be provided on a particular URL address in order to no one else but a particular interested party may access that information therein.

Figure 3:
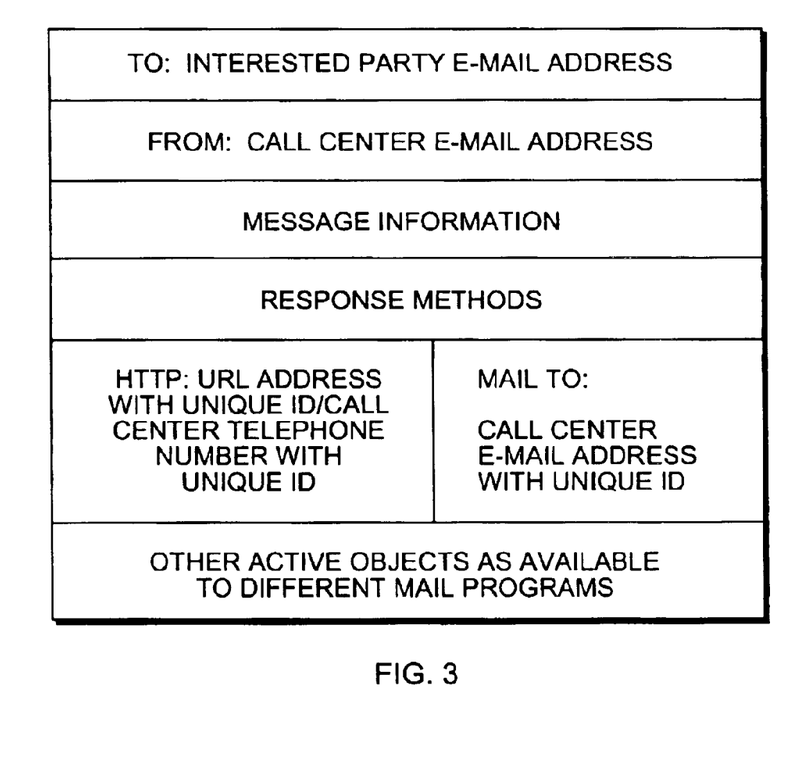
FIG. 3 is a schematic representation of an exemplar of an electronic mail message used in the present invention.

In one preferred embodiment of the present invention, the e-mail message will have two parts: a first part, which contains the e-mail address of the interested party and the particular message to be sent to the interested party; and a second part containing a response message portion. The response message portion includes at least one response method, which provides access to the call center and a unique ID, which identifies the interested party. The available response methods include "http" and "mail to". The http method includes a URL address along with the unique ID and/or the call center telephone number along with the unique ID. The mail to method includes the call center e-mail address along with the unique ID. When any of these methods are used, the uniqe ID will allow logging date and time indications when the message was read and responded to by the interested party at the interested party data terminal 10. The date and time can be stored in the e-mail log data base 180 and also in the interested party database 200. Of course, different mail programs allow embedding alternative active objects (e.g., Java, Activex, and Javascript), which can be used for automatic response methods.

Figure 4A:
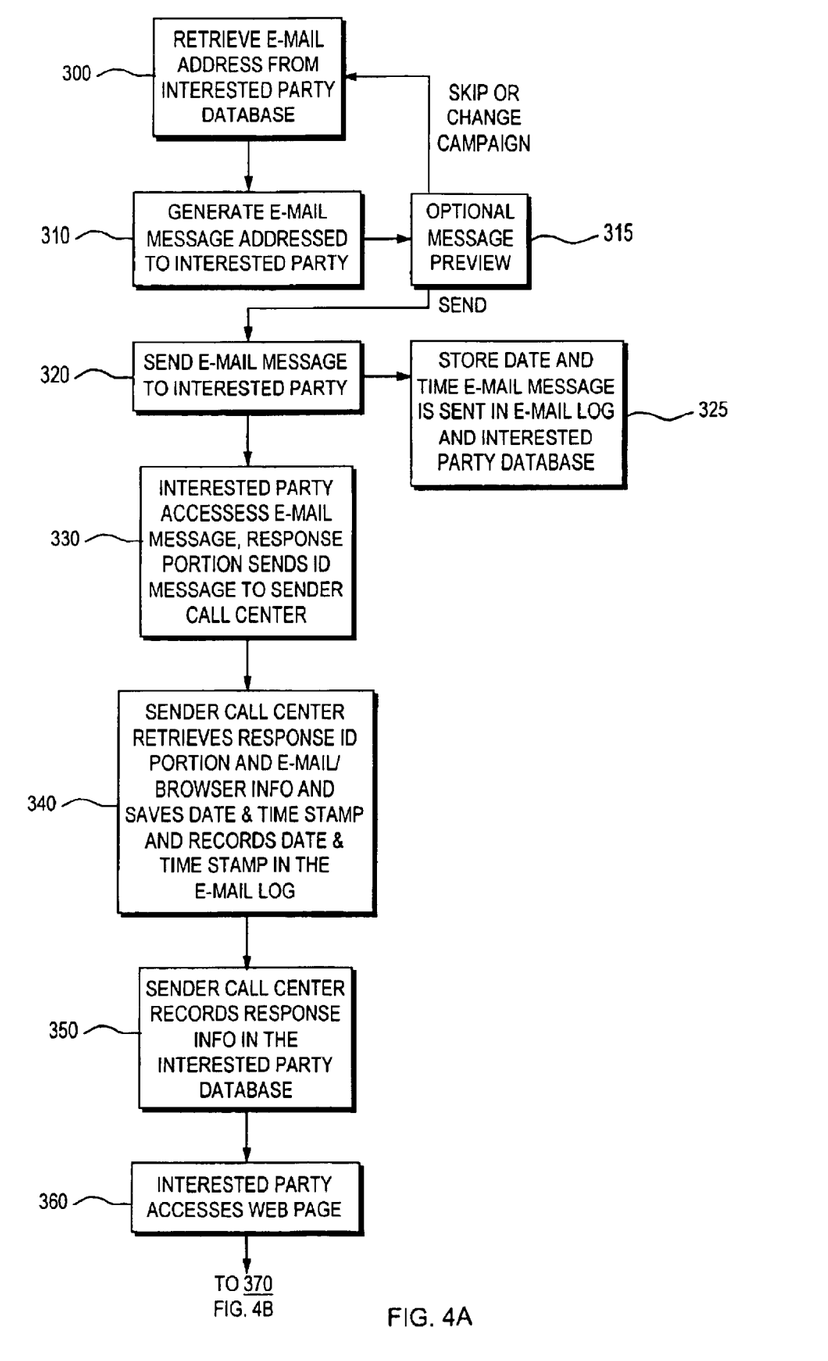
FIG. 4 is a flow-chart illustrating the method for utilizing a computer network in conjunction with traditional telemarketing according to the present invention.
Figure 4B:
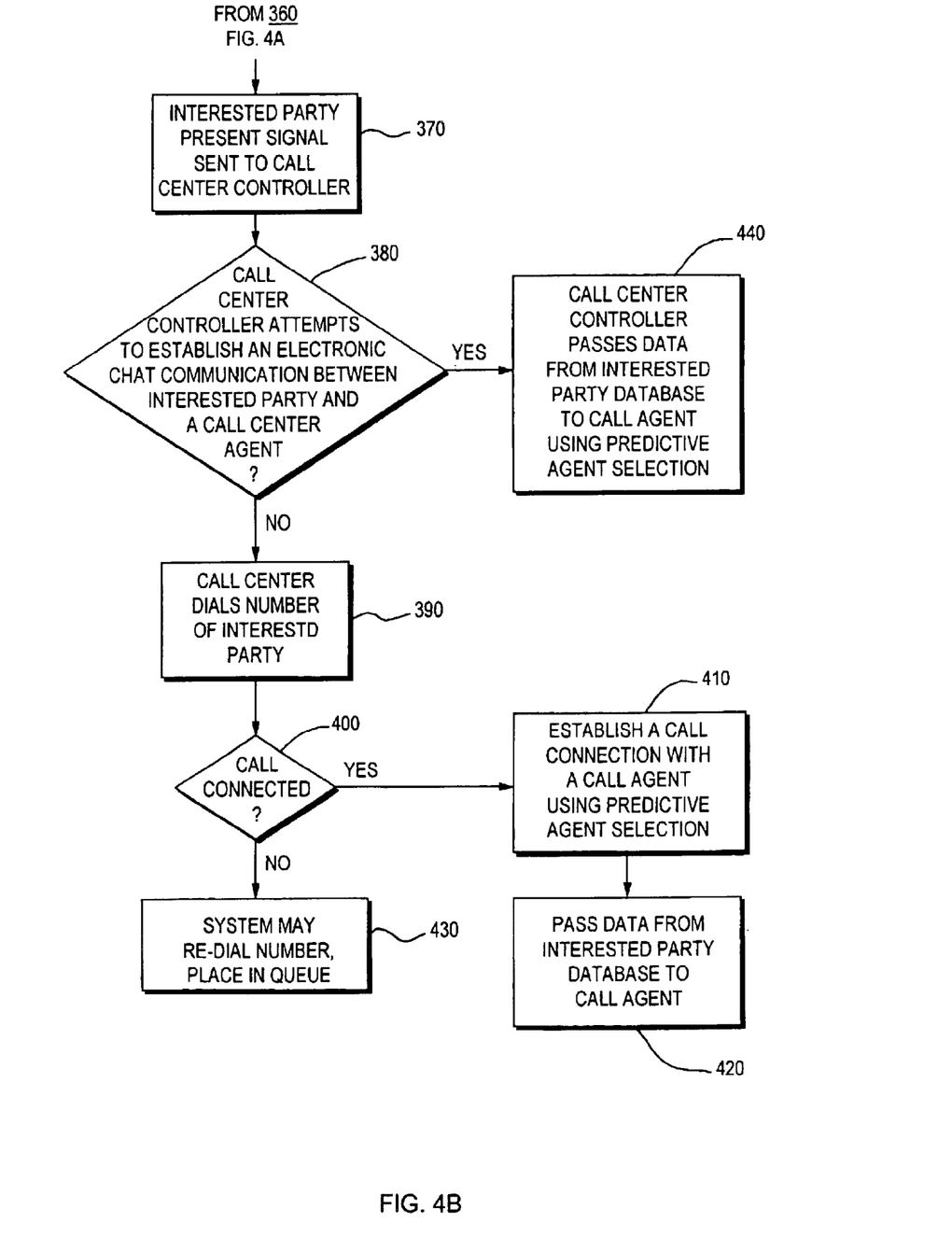

FIG. 4 is a flowchart which sets forth the steps in the method for utilizing a computer network in conjunction with traditional telemarketing. Beginning at step 300, the call center controller 160, retrieves the e-mail address from the interested party database 200. Step 310, an e-mail message is generated, formatted and addressed to the interested party. Optional step 315 routes the generated message to a call center agent who can preview the message, alter it if appropriate, skip the message or change the campaign if required. If the message is approved for transmission by the preview agent or if the optional preview step is not included in the method, then the message is sent to the interested party, step 320. In step 325, the time and date of the sending of the e-mail message is stored in both the e-mail log database 180, and the interested party database 200.

In step 330, the interested party retrieves the e-mail message and the response message portion sends the unique ID to the sender call center. If return receipt response is available, the unique ID is sent to the mail address, providing date of receipt. When a user selects URL or other response methods, the unique ID will post the date/time of receipt to the Web page 120. Step 340, the Web page 120 retrieves the response message unique ID and stores the date and time portion in the e-mail log database 180, and the interested party database 200. Other information that will be stored includes the response method chosen and the type of Web browser or e-mail program being used. This information will assist the call center in contacting an interested party on future attempts.

In step 360, the interested party access the Web page 120. Step 370, the Web page 120 sends an interested party present signal to the call center controller. Step 380, if the call center controller is able to establish an electronic chat link, the call center controller will pass data from the interested party database to a call center agent, step 440. In one embodiment, the appropriate agent will be selected by the call center controller using predictive agent selection systems and methods. If the call center controller 160 is unable to establish an electronic chat or if the interested party is not interested in electronic chat, the call center may retrieve the phone number of the interested party from the interested party database and attempt to call the interested party via traditional phone methods, step 390. One system that facilitates a call center telephoning an interested party is the UNISON® telephone call center management system manufactured by the Davox Corporation of Westford, Mass., the Assignee of the present invention.

In step 400, the system will determine whether a traditional telephone connection has been established. If it has, then, in step 410, then the connected call will be established between the interested party and a call center agent, using, for example, predictive agent selection methods and systems. Once the telephone connection is established between the interested party and the call center agent, data from the interested party database will be passed to the connected agent to assist the agent in handling the telephone call, step 420. If a telephone call is not connected in step 400, then the system may re-dial the interested party telephone number or place the number in a queue for dialing in the future, step 430.

Modifications and substitutions by one of ordinary skill in the art are considered to be within the scope of the present invention which is not to be limited except by the claims which follow.

What is claimed is:

1. A system for contacting an interested party utilizing a computer network, said system comprising:
   at least one interested party database including at least one field of information containing at least a first electronic-mail address, for addressing a first electronic-mail message to a first interested party;
   at least one electronic-mail generator, responsive to said first electronic-mail address, for generating said first electronic-mail message, said first electronic-mail message including at least one electronic address of at least one source of information accessible by said first interested party via said computer network, and for sending said first electronic-mail message to said first electronic-mail address of said first interested party, said first electronic-mail message further including a unique ID distinct from said first electronic-mail address and specific to said first electronic-mail message and identifying said interested party;
   at least one call center controller, electronically connected to said source of information and to at least one call center agent, for monitoring said source of information to detect when said first interested party has accessed said source of information via said computer network, and for detecting said unique ID information allowing said call center to identify said interested party and said first electronic-mail message, and for connecting at least one call center agent to said first interested party while said first interested party is accessing said source of information.

2. The system as claimed in claim 1 wherein said first electronic-mail message is encrypted.

3. The system as claimed in claim 1 wherein said first electronic-mail message is an audio message.

4. The system as claimed in claim 1 wherein said first electronic-mail message is an audio-visual, multi-media message.

5. The system as claimed in claim 1 wherein said computer network is a TCP/IP network.

6. The system as claimed in claim 1 wherein said call center controller establishes an electronic chat link between said interested party and at least one call center agent.

7. The system as claimed in claim 1 wherein said call center controller establishes a telephone link between said interested party and at least one call center agent.

8. The system as claimed in claim 1 wherein said electronic address if a TCP/IP address.

9. The system as claimed in claim 1, wherein said source of information comprises an Internet World-Wide-Web page.

10. A method of connecting an interested party to at least one call center agent at a call center utilizing a computer network, said method comprising the acts of:
    retrieving, at a call center controller, an electronic-mail (e-mail) address of an interested party from an interested party database;
    generating, formatting and addressing an e-mail message to said interested party, said e-mail message including a message portion and a response portion, said message portion including an electronic address of a source of information available to said interested party, said response portion including a unique ID distinct from said e-mail address of said interested party and identifying said interested party and said e-mail message;
    sending said e-mail message to said interested party;
    storing a date and time that said e-mail message is sent to said interested party;
    sending said e-mail message response portion, including said unique ID identifying said interested party to said call center that sent said e-mail message upon receipt of said e-mail message by said interested party;
    monitoring, using said call center controller, said source of information and generating and sending an interested party present signal to said call center when said interested party accesses said source of information, said signal including said unique ID information allowing said call center to identify said interested party and said e-mail message; and
    establishing an electronic chat link between at least one call center agent and said interested party, said electronic chat link being initiated by said call center controller.

11. The method of claim 10 further comprising the step of routing a generated e-mail message to a call center agent for preview and approval for sending.

12. The method of claim 10 wherein said step of storing a date and time that said e-mail message is sent to said interested party comprises storing said date and time in an e-mail log.

13. The method of claim 12 wherein said step of storing a date and time that said e-mail message is sent to said interested party further comprises storing said date and time in said interested party database.

14. The method of claim 10 further comprising the step of passing data from said interested party database to said at least one call center agent when said electronic chat link is established between said at least one call center agent and said interested party.

15. A method of connecting an interested party to at least one call center agent at a call center utilizing a computer network, said method comprising the acts of:

retrieving, at a call center controller, an electronic-mail (e-mail) address of an interested party from an interested party database;

generating, formatting and addressing an e-mail message to said interested party, said e-mail message including a message portion and a response portion, said message portion including an electronic address of a source of information available to said interested party, said response portion including a unique ID distinct from said e-mail address of said interested party and identifying said interested party and said e-mail message;

sending said e-mail message to said interested party;

storing a date and time that said e-mail message is sent to said interested party;

sending said e-mail message response portion, including said unique ID identifying said interested party to said call center that sent said e-mail message upon receipt of said e-mail message by said interested party;

monitoring, using said call center controller, said source of information and generating and sending an interested party present signal to said call center when said interested party accesses said source of information, said signal including said unique ID information allowing said call center to identify said interested party and said e-mail message; and retrieving a telephone number for said interested party from said interested party database and attempting to establish voice communications between at least one call center agent and said interested party.

16. The method of connecting an interested party to at least one call center agent at a call center utilizing a computer network as claimed in claim 15 further comprising the step of passing data from said interested party database to said at least one call center agent if said voice communications are established to assist said at least one call center agent in handling said voice communications.

17. The method of connecting an interested party to at least one call center agent at a call center utilizing a computer network as claimed in claim 15 further comprising the step of placing said interested party telephone number in a queue for dialing in the future if voice communications are not established.

* * * * *